United States Patent
Tange et al.

(10) Patent No.: US 7,107,137 B2
(45) Date of Patent: Sep. 12, 2006

(54) AUTOMOTIVE LANE DEVIATION PREVENTION APPARATUS

(75) Inventors: Satoshi Tange, Kanagawa (JP); Genpei Naito, Yokohama (JP); Shinji Matsumoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 198 days.

(21) Appl. No.: 10/798,405

(22) Filed: Mar. 12, 2004

(65) Prior Publication Data
US 2004/0186650 A1    Sep. 23, 2004

(30) Foreign Application Priority Data
Mar. 20, 2003    (JP)    ............................. 2003-078662

(51) Int. Cl.
*G06F 7/70* (2006.01)
(52) U.S. Cl. ......................................... 701/70; 701/301
(58) Field of Classification Search ................... 701/70, 701/96, 300, 301; 348/148, 149; 342/454, 342/455; 340/436, 903; 303/121, 193; 180/170
See application file for complete search history.

(56) References Cited

U.S. PATENT DOCUMENTS

| | | | |
|---|---|---|---|
| 6,665,603 B1 | 12/2003 | Jindo et al. | |
| 6,708,098 B1 * | 3/2004 | Matsumoto et al. | 701/70 |
| 6,879,890 B1 * | 4/2005 | Matsumoto et al. | 701/23 |
| 6,970,777 B1 * | 11/2005 | Tange et al. | 701/41 |
| 6,970,787 B1 * | 11/2005 | Matsumoto et al. | 701/301 |
| 2003/0195667 A1 * | 10/2003 | Tange et al. | 701/1 |
| 2004/0010371 A1 * | 1/2004 | Matsumoto et al. | 701/300 |
| 2004/0107035 A1 * | 6/2004 | Matsumoto et al. | 701/70 |
| 2004/0158377 A1 * | 8/2004 | Matsumoto et al. | 701/48 |
| 2004/0230375 A1 * | 11/2004 | Matsumoto et al. | 701/301 |
| 2005/0125125 A1 * | 6/2005 | Matsumoto et al. | 701/41 |
| 2005/0125153 A1 * | 6/2005 | Matsumoto et al. | 701/300 |

FOREIGN PATENT DOCUMENTS

| | | |
|---|---|---|
| JP | 05-058319 A | 3/1993 |
| JP | 11-96497 A | 4/1999 |
| JP | 2000-33860 A | 2/2000 |
| JP | 2000-272490 A | 10/2000 |
| JP | 2001-176000 A | 6/2001 |

(Continued)

OTHER PUBLICATIONS

U.S. Appl. No. 10/798,407, filed Mar. 12, 2004, Tange et al.

*Primary Examiner*—Gary Chin
(74) *Attorney, Agent, or Firm*—Foley & Lardner LLP

(57) ABSTRACT

An automotive lane deviation prevention apparatus sets and determines a yaw moment allotted amount corresponding to a yaw-moment-control lane-deviation-avoidance (LDA) controlled variable used to avoid a host vehicle's lane deviation by yaw moment control and a deceleration rate allotted amount corresponding to a deceleration-control LDA controlled variable used to avoid the host vehicle's lane deviation by deceleration control, based on a host vehicle's yaw angle, when the host vehicle has a tendency to deviate from a driving lane. A desired yaw moment is calculated based on the yaw moment allotted amount so that a yaw moment is produced in a direction in which the host vehicle's lane-deviation tendency is avoided. A controlled variable for deceleration control is calculated based on the deceleration rate allotted amount. A braking force of each individual road wheel is controlled based on the desired yaw moment and the controlled variable for deceleration control.

10 Claims, 4 Drawing Sheets

FOREIGN PATENT DOCUMENTS

| | | |
|---|---|---|
| JP | 2001-310719 A | 11/2001 |
| JP | 2002-200930 A | 7/2002 |
| JP | 2003-040132 A | 2/2003 |
| JP | 2003-058997 A | 2/2003 |

* cited by examiner

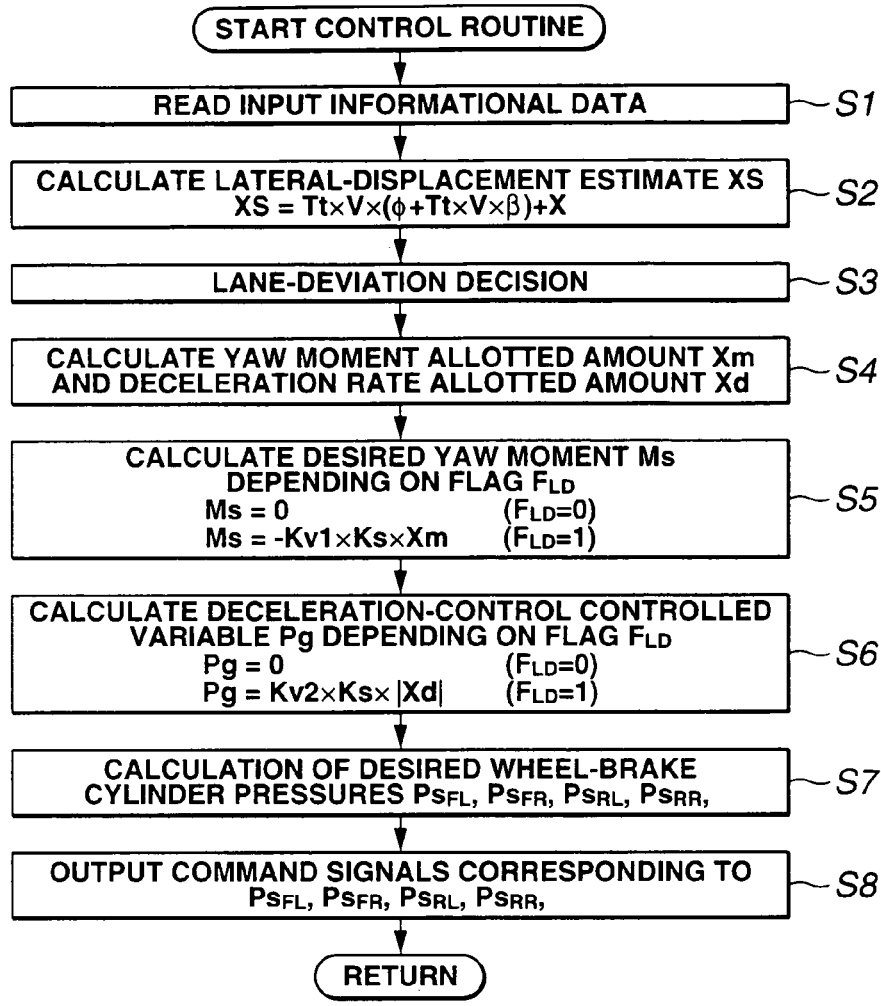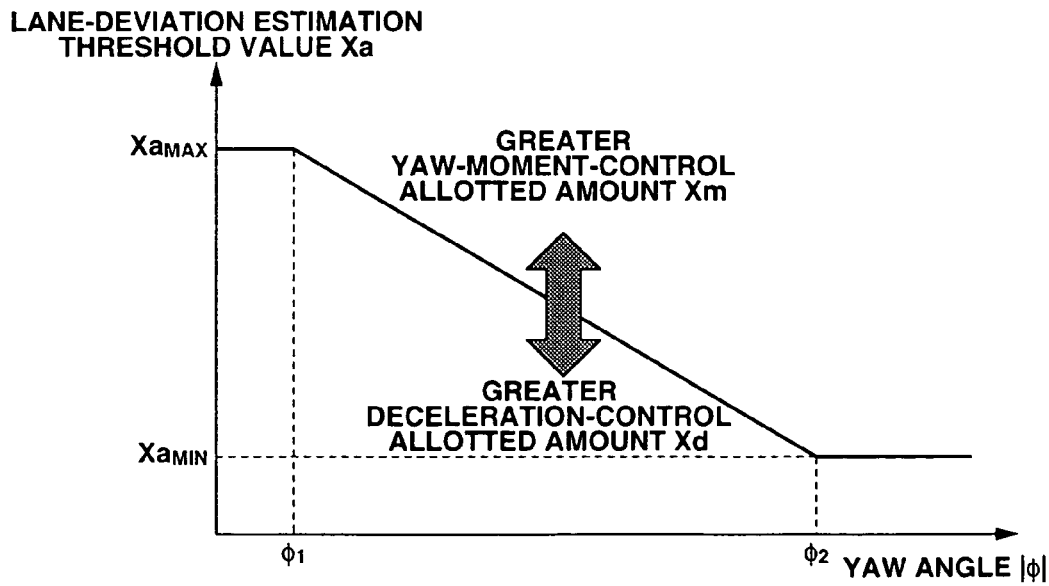

AUTOMOTIVE LANE DEVIATION PREVENTION APPARATUS

TECHNICAL FIELD

The present invention relates to an automotive lane deviation prevention apparatus, and specifically to the improvement of an automatic lane deviation prevention control technology capable of preventing a host vehicle from deviating from its driving lane by controlling a braking force of each road wheel when the host vehicle tends to deviate from the driving lane.

BACKGROUND ART

In recent years, there have been proposed and developed various automatic lane deviation prevention control technologies. An automatic lane deviation prevention device, capable of executing a lane deviation prevention function, often abbreviated to "LDP function" or a lane deviation avoidance function, often abbreviated to "LDA function", has been disclosed in Japanese Patent Provisional Publication No. 2000-33860 (hereinafter is referred to as "JP2000-33860"). In the lane deviation prevention (LDP) device disclosed in JP2000-33860, when there is a possibility that a host vehicle deviates from its traffic lane, in order to prevent the host vehicle's deviation from the driving lane, the LDP device controls a braking force of each road wheel depending on a host vehicle's lateral displacement or a host vehicle's lateral deviation from a central axis (a reference axis) of the current driving lane, so that a yawing moment is produced to achieve the host vehicle's return to the reference axis. In such an LDP device as disclosed in JP2000-33860, to avoid the driver from feeling considerable discomfort owing to undesirable fluctuations in the host vehicle's speed, such as rapid vehicle deceleration which may occur during LDP control, a controlled variable of the braking force of each road wheel is generally limited.

SUMMARY OF THE INVENTION

However, limiting the controlled variable of the braking force of each road wheel often exerts a bad influence on the LDP control accuracy and thus lowers the ability to avoid the host vehicle's lane deviation. For instance when the host vehicle goes around a steep curve and the host vehicle's lateral deviation from the central axis (the reference axis) of the current driving lane becomes great, there is an increased tendency for a yaw moment less than the magnitude of yaw moment required to satisfactorily reduce the actual host vehicle's lateral deviation from the reference axis to be produced owing to such a limit for the controlled variable of the braking force of each road wheel. This results in an undesirably great turning radius, thus deteriorating the control performance of the braking-force actuator based LDP control system.

Accordingly, it is an object of the invention to provide an automotive lane deviation prevention (LDP) apparatus, capable of greatly enhancing the lane deviation prevention performance by way of improved braking force control based on an optimal combination of a yaw-moment-control lane-deviation-avoidance (LDA) controlled variable and a deceleration-control LDA controlled variable, even when a host vehicle goes around a steep curve and thus the host vehicle's turning radius tends to increase.

In order to accomplish the aforementioned and other objects of the present invention, an automotive lane deviation prevention apparatus comprises braking force actuators that adjust braking forces applied to respective road wheels, sensors that detect a driving state of a host vehicle and a traveling-path condition where the host vehicle is traveling, and a control unit being configured to be electronically connected to the braking force actuators and the sensors, for controlling the braking force actuators in response to signals from the sensors for lane deviation avoidance purposes, the control unit comprising a lane-deviation-avoidance (LDA) controlled variable setting section that sets a yaw-moment-control LDA controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition, when the host vehicle has a tendency to deviate from a driving lane, and a control section that controls the braking force of each of the road wheels based on the yaw-moment-control LDA controlled variable and the deceleration-control LDA controlled variable.

According to another aspect of the invention, an automotive lane deviation prevention apparatus comprises braking force actuators that adjust braking forces applied to respective road wheels, sensors that detect a driving state of a host vehicle and a traveling-path condition where the host vehicle is traveling, and a control unit being configured to be electronically connected to the braking force actuators and the sensors, for controlling the braking force actuators in response to signals from the sensors for lane deviation avoidance purposes, the control unit comprising a lane-deviation tendency detection section that determines whether the host vehicle has a tendency to deviate from a driving lane, a lane-deviation-avoidance (LDA) controlled variable setting section that sets a yaw-moment-control LDA controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition in presence of the host vehicle's lane-deviation tendency, a desired yaw moment calculation section that calculates a desired yaw moment based on the yaw-moment-control LDA controlled variable so that a yaw moment is produced in a direction in which the host vehicle's lane-deviation tendency is avoided, a deceleration-control controlled variable calculation section that calculates a controlled variable for the deceleration control based on the deceleration-control LDA controlled variable, and a control section that controls the braking force of each of the road wheels based on the desired yaw moment and the controlled variable for the deceleration control.

According to a further aspect of the invention, a method of preventing lane deviation of a host vehicle equipped with braking force actuators that adjust braking forces applied to respective road wheels and sensors that detect a driving state of the host vehicle and a traveling-path condition where the host vehicle is traveling, the method comprises setting a yaw-moment-control lane-deviation-avoidance (LDA) controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition, when the host vehicle has a tendency to deviate from a driving lane, and controlling the braking force of each of the road wheels based on the yaw-moment-control LDA controlled variable and the deceleration-control LDA controlled variable.

According to a still further aspect of the invention, an automotive lane deviation prevention apparatus comprises braking force adjusting means for adjusting braking forces applied to respective road wheels, sensor means for detecting a driving state of a host vehicle and a traveling-path condition where the host vehicle is traveling, and a control unit being configured to be electronically connected to the braking force adjusting means and the sensor means, for controlling the braking force adjusting means in response to signals from the sensor means for lane deviation avoidance purposes, the control unit comprising lane-deviation-avoidance (LDA) controlled variable setting means for setting a yaw-moment-control LDA controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition, when the host vehicle has a tendency to deviate from a driving lane, and control means for controlling the braking force of each of the road wheels based on the yaw-moment-control LDA controlled variable and the deceleration-control LDA controlled variable.

The other objects and features of this invention will become understood from the following description with reference to the accompanying drawings.

BRIEF DESCRIPTION OF THE DRAWINGS

FIG. 2 is a flow chart showing a lane deviation prevention control routine executed by the LDP apparatus of the embodiment of FIG. 1.

FIG. 3 is a predetermined |φ| versus Xa characteristic map used for the LDP control routine of FIG. 2.

DESCRIPTION OF THE PREFERRED EMBODIMENTS

Figure 1:
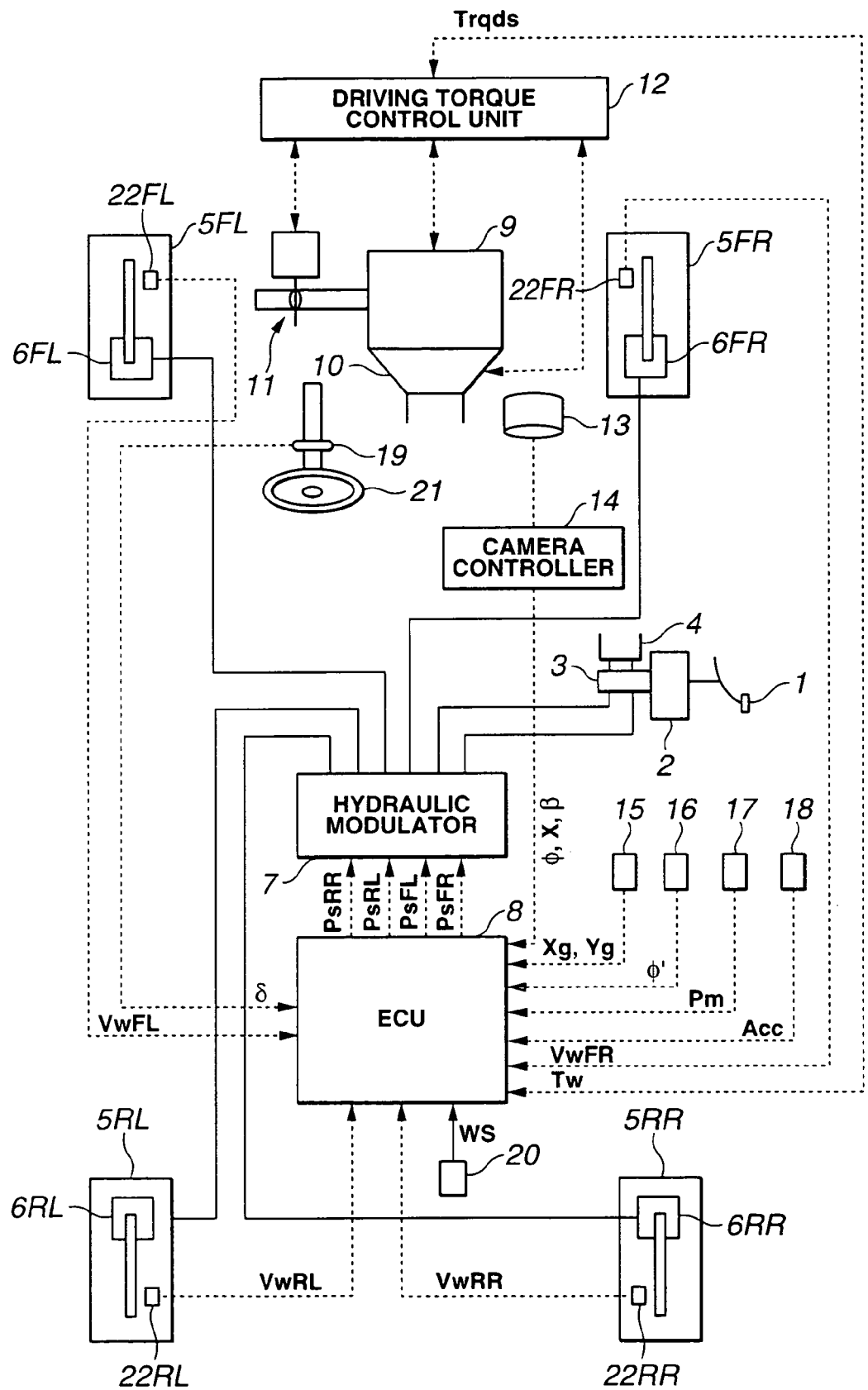
FIG. 1 is a system block diagram illustrating an embodiment of an automotive lane deviation prevention (LDP) apparatus.

Referring now to the drawings, particularly to FIG. 1, the lane deviation prevention (LDP) apparatus of the embodiment is exemplified in an adaptive cruise control (ACC) system equipped rear-wheel-drive vehicle employing an automatic transmission 10 and a rear differential. In the LDP apparatus of the embodiment shown in FIG. 1, as a braking force control system, which regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators (braking force actuators) respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electromagnetically-controlled solenoid valve that regulates the wheel-brake cylinder pressure to a desired pressure level. Each of the electromagnetically-controlled solenoid valves of hydraulic modulator 7 is responsive to a command signal from a braking/driving force control unit, simply an electronic control unit (ECU) 8, for regulating the wheel-cylinder pressure of each of wheel-brake cylinders 6FL-6RR in response to the command signal value from ECU 8, regardless of the braking action (brake-pedal depression) manually created by the driver's foot.

The ACC system equipped rear-wheel-drive vehicle of the embodiment of FIG. 1 also includes an electronic driving torque control unit 12 that controls a driving torque transmitted to rear road wheels 5RL and 5RR serving as drive wheels, by controlling an operating condition of an engine 9, a selected transmission ratio of automatic transmission 10, and/or a throttle opening of a throttle valve 11 (correlated to an accelerator opening Acc). Concretely, the operating condition of engine 9 can be controlled by controlling the amount of fuel injected or an ignition timing. Also, the engine operating condition can be controlled by the throttle opening control. Driving torque control unit 12 is designed to individually control the driving torque transmitted to rear road wheels 5RL and 5RR (drive wheels). Additionally, driving torque control unit 12 is responsive to a driving-torque command signal from ECU 8 in a manner so as to control the driving torque depending on the driving-torque command signal value.

The ACC system equipped rear-wheel-drive vehicle of the embodiment of FIG. 1 also includes a stereocamera with a charge-coupled device (CCD) image sensor, simply, a charge-coupled device (CCD) camera 13 and a camera controller 14 as an external recognizing sensor, which functions to detect a position of the ACC system equipped vehicle (the host vehicle) within the driving lane (the host vehicle's traffic lane) and whose sensor signal is used for lane deviation prevention control. Within camera controller 14, on the basis of an image-processing image data in front of the host vehicle and captured by CCD camera 13, a lane marker or lane marking, such as a white line, is detected and thus the current host vehicle's traffic lane, in other words, the current position of the host vehicle within the host vehicle's lane, is detected. Additionally, the processor of camera controller 14 calculates or estimates, based on the image data from CCD camera 13 indicative of the picture image, a host vehicle's yaw angle φ with respect to the sense of the current host vehicle's driving lane, a host vehicle's lateral displacement or a host vehicle's lateral deviation X from a central axis (a reference axis) of the current host vehicle's driving lane, and a curvature β of the current host vehicle's driving lane. The host vehicle's yaw angle φ means an angle between the sense of the current host vehicle's driving lane and the host vehicle's x-axis of a vehicle axis system (x, y, z). When the lane marker or lane marking, such as a white line, in front of the host vehicle, has worn away or when the lane markers or lane markings are partly covered by snow, it is impossible to precisely certainly recognize the lane markers or lane markings. In such a case, each of detection parameters, namely, the host vehicle's yaw angle φ, lateral deviation X, and curvature β is set to "0". In contrast, in presence of a transition from a white-line recognition enabling state that the lane marking, such as a white line, can be recognized continually precisely to a white-line recognition partly disabling state that the lane marking, such as a white line, cannot be recognized for a brief moment, owing to noise or a frontally-located obstacle, parameters φ, X, and β are held at their previous values $φ_{(n-1)}$, $X_{(n-1)}$ and $β_{(n-1)}$ calculated by camera controller 14 one cycle before.

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters φ, X, and β calculated by camera controller 14, and the signal indicative of a driving torque Tw, controlled and produced by driving-torque control unit 12, the input/output interface (I/O) of ECU 8 receives input information from various engine/vehicle switches and sensors, such as an acceleration sensor 15, a yaw rate sensor 16, a master-cylinder pressure sensor 17, an accelerator opening sensor 18, a steer angle sensor 19, front-left, front-right, rear-left, and rear-right wheel speed sensors 22FL, 22FR, 22RL, and 22RR, and a direction indicator switch 20. As seen from the system block diagram of FIG. 1, for mutual communication via a data link, ECU 8 is electrically connected to driving torque control unit 12. Acceleration sensor 15 is provided to detect a longitudinal acceleration Xg and a lateral acceleration Yg, exerted on the host vehicle. Yaw rate sensor 16 is provided to detect a yaw rate φ' (one of the host vehicle's driving states) resulting from a yaw moment acting on the host vehicle. Master-cylinder pressure sensor 17 is provided to detect a master-cylinder pressure Pm of master cylinder 3, that is, the amount of depression of brake pedal 1. Accelerator opening sensor 18 is provided to detect an accelerator opening Acc (correlated to a throttle opening), which is dependent on a manipulated variable of the driver's accelerator-pedal depression. Steer angle sensor 19 is provided to detect steer angle δ of a steering wheel 21. Front-left, front-right, rear-left, and rear-right wheel speed sensors 22FL, 22FR, 22RL, and 22RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwi". Direction indicator switch 20 is provided to detect whether a direction indicator is turned on and also to detect the direction indicated by the direction indicator, and to output a direction indicator switch signal WS. In addition to CCD camera 13 and camera controller 14, a radar controller using a radar sensor, such as a scanning laser radar sensor serving as an object detector, may be provided to more precisely capture, recognize, sense, or detect a preceding vehicle (or a relevant target vehicle), or a frontally located object, or a running vehicle on the adjacent lane. In such a case, in addition to the input informational data, namely the host vehicle's yaw angle φ, the host vehicle's lateral deviation X, and the curvature β of the current host vehicle's driving lane, additional input information, that is, a relative longitudinal distance Lx from the host vehicle to the preceding vehicle (or the frontally-located object), a relative lateral distance Ly from the host vehicle to the running vehicle on the adjacent lane (or the adjacently-located object), and a width Hs of the preceding vehicle or the frontally- or adjacently-located object can be detected or estimated, and input into the input interface of ECU 8. Within the ACC system, these input informational data are used for collision avoidance control as well as lane deviation prevention control. The previously-noted CCD camera 13 and camera controller 14 and the radar controller function as an external recognizing detector or a traveling-path condition detector, which detects a condition of the path where the host vehicle is traveling. In the presence of a directionality or polarity concerning left or right directions of each of the vehicle driving state indicative data and the traveling-path condition indicative data, namely, yaw rate φ', lateral acceleration Yg, steer angle δ, yaw angle φ, and lateral deviation X, a change in the vehicle driving state indicative data to the left is indicated as a positive value, while a change in the vehicle driving state indicative data to the right is indicated as a negative value. More concretely, during a left turn, yaw rate φ', lateral acceleration Yg, steer angle δ, and yaw angle φ are all indicated as positive values. Conversely during a right turn, these parameters φ', Yg, δ, and φ are all indicated as negative values. On the other hand, lateral deviation X is indicated as a positive value when the host vehicle is deviated from the central axis of the current driving lane to the left. Conversely when the host vehicle is deviated from the central axis of the current driving lane to the right, lateral deviation X is indicated as a negative value. The positive signal value of direction indicator switch signal WS from direction indicator switch 20 means a left turn (counterclockwise rotation of direction indicator switch 20), whereas the negative signal value of direction indicator switch signal WS from direction indicator switch 20 means a right turn (clockwise rotation of direction indicator switch 20). Within ECU 8, the central processing unit (CPU) allows the access by the I/O interface of input informational data signals from the previously-discussed engine/vehicle switches and sensors and camera controller 14 and driving torque control unit 12, and is responsible for carrying various control programs stored in the memories and capable of performing necessary arithmetic and logic operations. Computational results or arithmetic calculation results, in other words, calculated output signals or control command signals are relayed via the output interface circuitry to the output stages, for example, the solenoids of hydraulic modulator 7.

The LDP control routine executed by ECU 8 is hereunder described in detail in reference to the flow chart shown in FIG. 2. The control routine of FIG. 2 is executed as time-triggered interrupt routines to be triggered every predetermined sampling time intervals ΔT such as 10 milliseconds.

At step S1, input informational data from the previously-noted engine/vehicle switches and sensors, and driving-torque controller 12 and camera controller 14 are read. Concretely, read are engine/vehicle switch/sensor signal data, such as the host vehicle's longitudinal acceleration Xg, lateral acceleration Yg, yaw rate φ', wheel speeds Vwi ($Vw_{FL}$, $Vw_{FR}$, $Vw_{RL}$, $Vw_{RR}$), accelerator opening Acc, master-cylinder pressure Pm, steer angle δ, and direction indicator switch signal WS, and the signal data from driving-torque control unit 12 such as driving torque Tw, and the signal data from camera controller 14 such as the host vehicle's yaw angle φ with respect to the direction of the current host vehicle's driving lane, lateral deviation X from the central axis of the current host vehicle's driving lane, and curvature β of the current driving lane. The host vehicle's yaw angle φ may be calculated by integrating yaw rate φ' detected by yaw rate sensor 16.

At step S2, a lateral-displacement estimate XS, in other words, an estimate of a future lateral deviation or an estimate of a future lateral displacement, is estimated or arithmetically calculated. Concretely, a host vehicle's speed V is calculated as a simple average value $(Vw_{FL}+Vw_{FR})/2$ of front-left and front-right wheel speeds $Vw_{FL}$ and $Vw_{FR}$ (corresponding to wheel speeds of driven road wheels 5FL and 5FR), from the expression $V=(Vw_{FL}+Vw_{FR})/2$. Thereafter, lateral-displacement estimate XS is estimated or arithmetically calculated based on the latest up-to-date information concerning the host vehicle's yaw angle φ with respect to the direction of the current host vehicle's driving lane (in other words, the orientation of the host vehicle with respect to the direction of the current host vehicle's driving lane), lateral deviation X from the central axis of the current host vehicle's driving lane, curvature β of the current host vehicle's driving lane, and the host vehicle's speed V $(=(Vw_{FL}+Vw_{FR})/2)$, from the following expression (1).

$$XS=Tt\times V\times(\phi+Tt\times V\times\beta)+X \quad (1)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as a future lateral-displacement estimate XS.

At step S3, a check is made to determine whether there is a possibility or an increased tendency of lane deviation of the host vehicle from the current driving lane. Concretely, when lateral-displacement estimate XS becomes greater than or equal to a predetermined lateral-displacement criterion $X_c$, that is, in case of $XS \geq X_c$, ECU 8 determines that there is an increased tendency of lane deviation of the host vehicle from the current driving lane to the left, and thus a lane-deviation decision flag $F_{LD}$ is set to "1". On the contrary, in case of $XS<X_c$, another check is made to determine whether lateral-displacement estimate XS is less than or equal to a negative value $-X_c$ of predetermined lateral-displacement criterion $X_c$. In case of $XS \leq -X_c$, ECU 8 determines that there is an increased tendency for the host vehicle to deviate from the current driving lane to the right, and thus lane-deviation decision flag $F_{LD}$ is set to "1". Alternatively, when the condition defined by $XS \geq X_c$ and $XS \leq -X_c$ are both unsatisfied, that is to say, in case of $-X_c<XS<X_c$, ECU 8 determines that there is a less possibility of the host vehicle's lane deviation from the current driving lane to the right or to the left, and thus lane-deviation decision flag $F_{LD}$ is reset to "0".

At step S4, a yaw moment allotted amount (or a yaw-moment-control allotted amount) Xm and a vehicle deceleration rate allotted amount (or a deceleration-control allotted amount) Xd are calculated. Concretely, a difference $(XS-X_c)$ between lateral-displacement estimate XS and predetermined lateral-displacement criterion $X_c$ is divided into yaw moment allotted amount Xm and deceleration rate allotted amount Xd. Yaw moment allotted amount Xm corresponds to a controlled variable for yaw moment control through which a yaw moment is produced in a direction that the host vehicle's lane deviation from the driving lane is avoided and thus the degree of lane deviation of the host vehicle is reduced, whereas deceleration rate allotted amount Xd corresponds to a controlled variable for vehicle deceleration control through which the host vehicle is decelerated and thus the degree of lane deviation is reduced. More concretely, a check is made to determine whether the difference $(|XS|-X_c)$ between the absolute value $|XS|$ of lateral-displacement estimate XS and predetermined lateral-displacement criterion $X_c$ is less than a lane-deviation estimation threshold value Xa. Lane-deviation estimation threshold value Xa is calculated or retrieved from the preprogrammed yaw-angle $|\phi|$ versus threshold value Xa characteristic map of FIG. 3 showing how a lane-deviation estimation threshold value Xa has to be varied relative to an absolute value $|\phi|$ of yaw angle φ. As can be appreciated from the preprogrammed characteristic map of FIG. 3 showing the relationship between threshold value Xa and yaw-angle absolute value $|\phi|$, in a small yaw-angle range $(0 \leq |\phi| \leq \phi_1)$ from 0 to a predetermined yaw angle $\phi_1$, threshold value Xa is fixed to a predetermined maximum threshold value $Xa_{MAX}$. In an intermediate yaw-angle range $(\phi_1<|\phi| \leq \phi_2)$ from the predetermined small yaw angle $\phi_1$ to a predetermined large yaw angle $\phi_2$ (larger than $\phi_1$), threshold value Xa gradually reduces to a predetermined minimum threshold value $Xa_{MIN}$, as the yaw-angle absolute value $|\phi|$ increases. In an excessively large yaw-angle range $(\phi_2<|\phi|)$ above predetermined large yaw angle $\phi_2$, threshold value Xa is fixed to predetermined minimum threshold value $Xa_{MIN}$.

When the difference $(|XS|-X_c)$ between the absolute value $|XS|$ of lateral-displacement estimate XS and predetermined lateral-displacement criterion $X_c$ is less than lane-deviation estimation threshold value Xa, that is, when $(|XS|-X_c)<Xa$ and thus there is a less lane-deviation tendency, the difference $(XS-X_c)$ between lateral-displacement estimate XS and predetermined lateral-displacement criterion $X_c$ is divided into yaw moment allotted amount Xm and deceleration rate allotted amount Xd in accordance with the following expression (2), depending on whether lateral-displacement estimate XS is positive or negative.

In case of $XS \geq 0$:

$$Xm=XS-X_c$$

$$Xd=0$$

In case of $XS<0$:

$$Xm=XS+X_c$$

$$Xd=0 \quad (2)$$

Conversely when the difference $(|XS|-X_c)$ between the absolute value $|XS|$ of lateral-displacement estimate XS and predetermined lateral-displacement criterion $X_c$ is greater than or equal to lane-deviation estimation threshold value Xa, that is, when $(|XS|-X_c) \geq Xa$ and thus there is an increased lane-deviation tendency, the difference {corresponding to the value $(XS-X_c)$ in case of $XS \geq X_c$ and also corresponding to the value $(XS+X_c)$ in case of $XS<-X_c$} between lateral-displacement estimate XS and predetermined lateral-displacement criterion $X_c$ is divided into yaw moment allotted amount Xm and deceleration rate allotted amount Xd in accordance with the following expression (3), depending on whether lateral-displacement estimate XS is greater than or equal to the predetermined positive lateral-displacement criterion $X_c$ or less than the predetermined negative lateral-displacement criterion $-X_c$.

In case of $XS \geq X_c$:

$Xm = Xa$ $Xd = XS - X_c - Xa$

In case of $XS < -X_c$:

$Xm = -Xa$ $Xd = XS + X_c + Xa$ \hfill (3)

As can be appreciated from the relationship between settings of yaw moment allotted amount Xm and deceleration rate allotted amount Xd (see the expressions (2) and (3), according to the LDP apparatus of the embodiment, the difference $(XS-X_c)$ between lateral-displacement estimate XS and predetermined lateral-displacement criterion $X_c$ is divided and preferentially allotted to yaw moment allotted amount Xm, and the remainder of the difference {corresponding to the value $(XS-X_c)$ in case of $XS \geq -X_c$ and also corresponding to the value $(XS+X_c)$ in case of $XS < -X_c$} is allotted to deceleration rate allotted amount Xd. That is, the LDP apparatus of the embodiment can properly limit or adjust yaw moment allotted amount Xm (corresponding to a yaw-moment-control lane-deviation-avoidance controlled variable) based on at least one of the host vehicle's driving state and the traveling-path condition by preferentially allotting a future lane-deviation estimate calculated as the difference $(|XS|-X_c)$ between the absolute value $|XS|$ of lateral-displacement estimate XS and predetermined lateral-displacement criterion $X_c$ to yaw moment allotted amount Xm and by allotting the remainder of the future lane-deviation estimate $|XS|-X_c$ to deceleration rate allotted amount Xd (corresponding to a deceleration-control lane-deviation-avoidance controlled variable). For the reasons discussed above, for instance, when there is a less lane-deviation tendency, that is, when $(|XS|-X_c)<Xa$, deceleration rate allotted amount Xd is set to "0" irrespective of whether lateral-displacement estimate XS is positive or negative, and therefore it is possible to effectively suppress undesirable host vehicle speed fluctuations, thus avoiding the driver from feeling discomfort owing to the speed fluctuations. Additionally, as can be seen from the preprogrammed $|\phi|$ versus Xa characteristic map of FIG. 3, the larger the absolute value $|\phi|$ of yaw angle $\phi$, the smaller the lane-deviation estimation threshold value Xa. Therefore, when the host vehicle greatly laterally deviates from the current driving lane, in other words, the yaw-angle absolute value $|\phi|$ becomes great, lane-deviation estimation threshold value Xa is set to a smaller value. Owing to such a comparatively small lane-deviation estimation threshold value Xa, deceleration rate allotted amount Xd becomes set temporarily to a relatively large value. As a result of this, the host vehicle effectively decelerates and therefore deceleration rate allotted amount Xd begins to reduce at an earlier timing.

At step S5, a desired yaw moment Ms is arithmetically calculated or estimated based on yaw moment allotted amount Xm calculated through step S4. Concretely, a check is made to determine whether lane-deviation decision flag $F_{LD}$, determined through step S3, is set (=1) or reset (=0). When lane-deviation decision flag $F_{LD}$ is set (=1) and the host vehicle has an increased tendency to deviate from the driving lane, desired yaw moment Ms is arithmetically calculated from the following expression (4).

$Ms = -Kv1 \times Ks \times Xm$ \hfill (4)

where Kv1 denotes a proportional gain that is determined by specifications of the host vehicle, and Ks denotes a proportional gain that is determined by host vehicle speed V.

Conversely when lane-deviation decision flag $F_{LD}$ is reset (=0) and the host vehicle has a less lane-deviation tendency, desired yaw moment Ms is set to "0".

At step S6, a controlled variable for vehicle deceleration control, simply a deceleration-control controlled variable Pg is arithmetically calculated or estimated based on deceleration rate allotted amount Xd. Concretely, a check is made to determine whether lane-deviation decision flag $F_{LD}$ is set (=1) or reset (=0). When lane-deviation decision flag $F_{LD}$ is set and the host vehicle has an increased lane-deviation tendency, deceleration-control controlled variable Pg is arithmetically calculated from the following expression (5).

$Pg = Kv2 \times Ks \times |Xd|$ \hfill (5)

where Kv2 denotes a proportional gain that is determined by specifications of the host vehicle, and Ks denotes the proportional gain that is determined by host vehicle speed V.

Conversely when lane-deviation decision flag $F_{LD}$ is reset (=0) and the host vehicle has a less lane-deviation tendency, deceleration-control controlled variable Pg is set to "0".

At step S7, front-left, front-right, rear-left, and rear-right desired wheel-brake cylinder pressures $Ps_{FL}$, $Ps_{FR}$, $Ps_{RL}$ and $Ps_{RR}$, which are collectively referred to as "Psi", are calculated and determined based on desired yaw moment Ms determined through step S5 and deceleration-control controlled variable Pg determined through step S6, depending on whether lane-deviation decision flag $F_{LD}$ is set or reset.

Concretely, in case of $F_{LD}=0$, that is, when there is a less lane-deviation tendency, front-left and front-right desired wheel-brake cylinder pressures $Ps_{FL}$ and $Ps_{FR}$ for front wheel-brake cylinders 6FL and 6FR are set to "0", whereas rear-left and rear-right desired wheel-brake cylinder pressures $Ps_{RL}$ and $Ps_{RR}$ for rear wheel-brake cylinders 6RL and 6RR are set to "0" (see the following expressions).

$Ps_{FL}=0$ $Ps_{FR}=0$ $Ps_{RL}=0$ $Ps_{RR}=0$

Conversely, in case of $F_{LD}=1$, that is, when there is an increased lane-deviation tendency, desired wheel-brake cylinder pressures $Ps_{FL}$, $Ps_{FR}$, $Ps_{RL}$ and $Ps_{RR}$ are determined depending on the magnitude of desired yaw moment Ms determined through step S5. More concretely, when the absolute value $|MS|$ of desired yaw moment Ms is less than a predetermined desired yaw-moment threshold value Ms0, (i.e., $|Ms|<Ms0$), the processor of ECU 8 determines each of desired wheel-brake cylinder pressures $Ps_{FL}$ through $Ps_{RR}$ in such a manner as to provide only the differential pressure between rear road wheels 5RL and 5RR. In other words, the differential pressure between front road wheels 5FL and 5FR is set to "0". Thus, in case of $|Ms|<Ms0$, the front desired wheel-brake cylinder pressure difference $\Delta Ps_F$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are determined as follows.

$\Delta Ps_F = 0$ $$\Delta Ps_R = 2 \times Kb_R \times |Ms|/T \quad (6)$$

where $Kb_R$ denotes a predetermined conversion coefficient used to convert a rear-wheel braking force into a rear wheel-brake cylinder pressure and T denotes a rear-wheel tread (or a rear-wheel track). In the shown embodiment, the rear-wheel track T is set to be identical to a front-wheel track.

Conversely when the absolute value |Ms| of desired yaw moment Ms is greater than or equal to the predetermined threshold value Ms0, (i.e., |Ms|≧Ms0), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_F$ and $\Delta Ps_R$ are represented by the following expressions (7) and (8).

$$\Delta Ps_F = 2 \times Kb_F \times (|Ms| - Ms0)/T \quad (7)$$

$$\Delta Ps_R = 2 \times Kb_R \times Ms0/T \quad (8)$$

where $Kb_F$ denotes a predetermined conversion coefficient used to convert a front-wheel braking force into a front wheel-brake cylinder pressure, $Kb_R$ denotes a predetermined conversion coefficient used to convert a rear-wheel braking force into a rear wheel-brake cylinder pressure, T of the expression (7) and T of the expression (8) denote front and rear wheel treads being the same in front and rear wheels, and Ms0 denotes the predetermined desired yaw-moment threshold value.

Therefore, when desired yaw moment Ms is a negative value (Ms<0), in other words, the host vehicle tends to deviate from the current driving lane to the left, in order to produce the component of yaw moment vector needed to rotate the host vehicle to the right, front-left desired wheel-brake cylinder pressure $Ps_{FL}$ is set to a front-wheel brake fluid pressure $Pg_F$, front-right desired wheel-brake cylinder pressure $Ps_{FR}$ is set to the sum $(Pg_F + \Delta Ps_F)$ of front-wheel brake fluid pressure $Pg_F$ and front desired wheel-brake cylinder pressure difference $\Delta Ps_F$, rear-left desired wheel-brake cylinder pressure $Ps_{RL}$ is set to rear-wheel brake fluid pressure $Pg_R$, and rear-right desired wheel-brake cylinder pressure $Ps_{RR}$ is set to the sum $(Pg_R + \Delta Ps_R)$ of rear-wheel brake fluid pressure $Pg_R$ and rear desired wheel-brake cylinder pressure difference $\Delta PSR$ (see the following expression (9)).

$$Ps_{FL} = Pg_F$$

$$Ps_{FR} = Pg_F + \Delta Ps_F$$

$$Ps_{RL} = Pg_R$$

$$Ps_{RR} = Pg_R + \Delta Ps_R \quad (9)$$

where front-wheel brake fluid pressure $Pg_F$ and rear-wheel brake fluid pressure $Pg_R$ are calculated and determined based on deceleration-control controlled variable Pg, taking into account an ideal front-and-rear braking force distribution.

On the contrary, when desired yaw moment Ms is a positive value (Ms≧0), in other words, the host vehicle tends to deviate from the current driving lane to the right, in order to produce the component of yaw moment vector needed to rotate the host vehicle to the left, front-left desired wheel-brake cylinder pressure $Ps_{FL}$ is set to the sum $(Pg_F + \Delta Ps_F)$ of front-wheel brake fluid pressure $Pg_F$ and front desired wheel-brake cylinder pressure difference $\Delta Ps_F$, front-right desired wheel-brake cylinder pressure $Ps_{FR}$ is set to front-wheel brake fluid pressure $Pg_F$, rear-left desired wheel-brake cylinder pressure $Ps_{RL}$ is set to the sum $(Pg_R + \Delta Ps_R)$ of rear-wheel brake fluid pressure $Pg_R$ and rear desired wheel-brake cylinder pressure difference $\Delta Ps_R$, and rear-right desired wheel-brake cylinder pressure $Ps_{RR}$ is set to rear-wheel brake fluid pressure $Pg_R$ (see the following expression (10)).

$$Ps_{FL} = Pg_F + \Delta Ps_F$$

$$Ps_{FR} = Pg_F$$

$$Ps_{RL} = Pg_R + \Delta Ps_R$$

$$Ps_{RR} = Pg_R \quad (10)$$

At step S8, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S7, are output from the output interface of ECU 8 to hydraulic modulator 7. In this manner, one cycle of the time-triggered interrupt routine (the LDP control routine of FIG. 2) terminates and the predetermined main program is returned.

On the other hand, in parallel with the routine of FIG. 2 (described previously) or the modified routine of FIG. 4 (described later), a desired driving torque Trqds arithmetic processing is made so as to properly control vehicle thereby reducing the engine output even when the accelerator pedal is depressed by the driver. For instance, in case of $F_{LD}=1$, a desired driving torque Trqds is arithmetically calculated based on both of a driving torque component determined based on accelerator opening Acc and a braking torque component determined based on a sum of front and rear desired wheel-brake cylinder pressure differences $\Delta Ps_F$ and $\Delta Ps_R$. On the contrary, in case of $F_{LD}=0$, desired driving torque Trqds is arithmetically calculated based on only the driving torque component needed to accelerate the host vehicle. At the same time as the output of each command signal corresponding to desired wheel-brake cylinder pressures $Ps_{FL}$-$Ps_{RR}$, a command signal corresponding to desired driving torque Trqds is output from the output interface of ECU 8 to driving torque control unit 12.

The LDP apparatus of the embodiment executing the control routine shown in FIG. 2 operates as follows.

Suppose that the traveling direction of the host vehicle greatly deviates from the axial direction of the central axis of the driving lane when the host vehicle goes around a steep curve to the right, and thus the angle (yaw angle φ) between the central axis of the host vehicle's driving lane and the longitudinal axis (the x-axis) of the host vehicle becomes large. At this time, within the processor of ECU 8, as seen from the flow chart of FIG. 2, input informational data (Xg, Yg, φ', Vwi, Acc, Pm, δ, WS, Tw, φ, X, and β) from the previously-noted engine/vehicle switches and sensors, and driving-torque controller 12 and camera controller 14 are read through step S1. Then, at step S2, lateral-displacement estimate XS (the estimate of the future lateral displacement) is calculated and set to a comparatively large value. Owing to such a comparatively large lateral-displacement estimate XS, arising from the large yaw angle φ, the processor of ECU 8 determines that there is an increased lane-deviation tendency and thus lane-deviation decision flag $F_{LD}$ is set to "1" through step S3. Under these conditions, that is, $F_{LD}=1$ and large yaw angle φ, lane-deviation estimation threshold value Xa is set to a relatively small value through step S4 (see the preprogrammed yaw-angle |φ| versus threshold value Xa characteristic map of FIG. 3). Assuming that the absolute value |XS| of lateral-displacement estimate XS calculated at step S2 is greater than or equal to the sum $(X_c+Xa)$ of predetermined lateral-displacement criterion $X_c$ and lane-deviation estimation threshold value Xa, in other words, $(|XS|-X_c) \geq Xa$, yaw moment allotted amount Xm is set to the comparatively small lane-deviation estimation threshold value Xa, whereas deceleration rate allotted amount Xd is set to the value $(XS-X_c-Xa)$ (see the expression (3)). After this, at step S5, desired yaw moment Ms is calculated and determined based on yaw moment allotted amount Xm, which is set to the comparatively small lane-deviation estimation threshold value Xa, from the expression $Ms=-Kv1 \times Ks \times Xm$, such that yaw moment allotted amount Xm reduces with the lapse of time. Additionally, at step S6, a comparatively great deceleration-control controlled variable Pg is calculated based on deceleration rate allotted amount Xd $(=XS-X_c-Xa)$ from the expression $Pg=Kv2 \times Ks \times |Xd|$, such that deceleration rate allotted amount Xd reduces with the lapse of time. Thereafter, at step S7, desired wheel-brake cylinder pressures $Ps_{FL}$, $Ps_{FR}$, $Ps_{RL}$ and $Ps_{RR}$ are calculated based on desired yaw moment Ms determined through step S5 and deceleration-control controlled variable Pg determined through step S6, and then at step S8 command signals corresponding to front-left, front-right, rear-left, and rear-right desired wheel-brake cylinder pressures $Ps_{FL}$, $Ps_{FR}$, $Ps_{RL}$, and $Ps_{RR}$, calculated based on deceleration-control controlled variable Pg through step S7, are output from the output interface of ECU 8 to hydraulic modulator 7. In response to the command signals, the wheel-brake cylinder pressures of road wheels 5FL, 5FR, 5RL, and 5RR are brought closer to the desired wheel-brake cylinder pressures $Ps_{FL}$, $Ps_{FR}$, $Ps_{RL}$, and $Ps_{RR}$. As a result, it is possible to properly greatly decelerate the host vehicle and to generate the yaw moment in a direction decreasing of yaw moment allotted amount Xm, in other words, in a direction that the host vehicle's lane-deviation tendency is avoided. As a consequence, it is possible to quickly reduce the host vehicle speed V at an earlier timing, thus effectively decreasingly compensating for the turning radius of the host vehicle and remarkably enhancing the lane deviation prevention performance.

Figure 4:
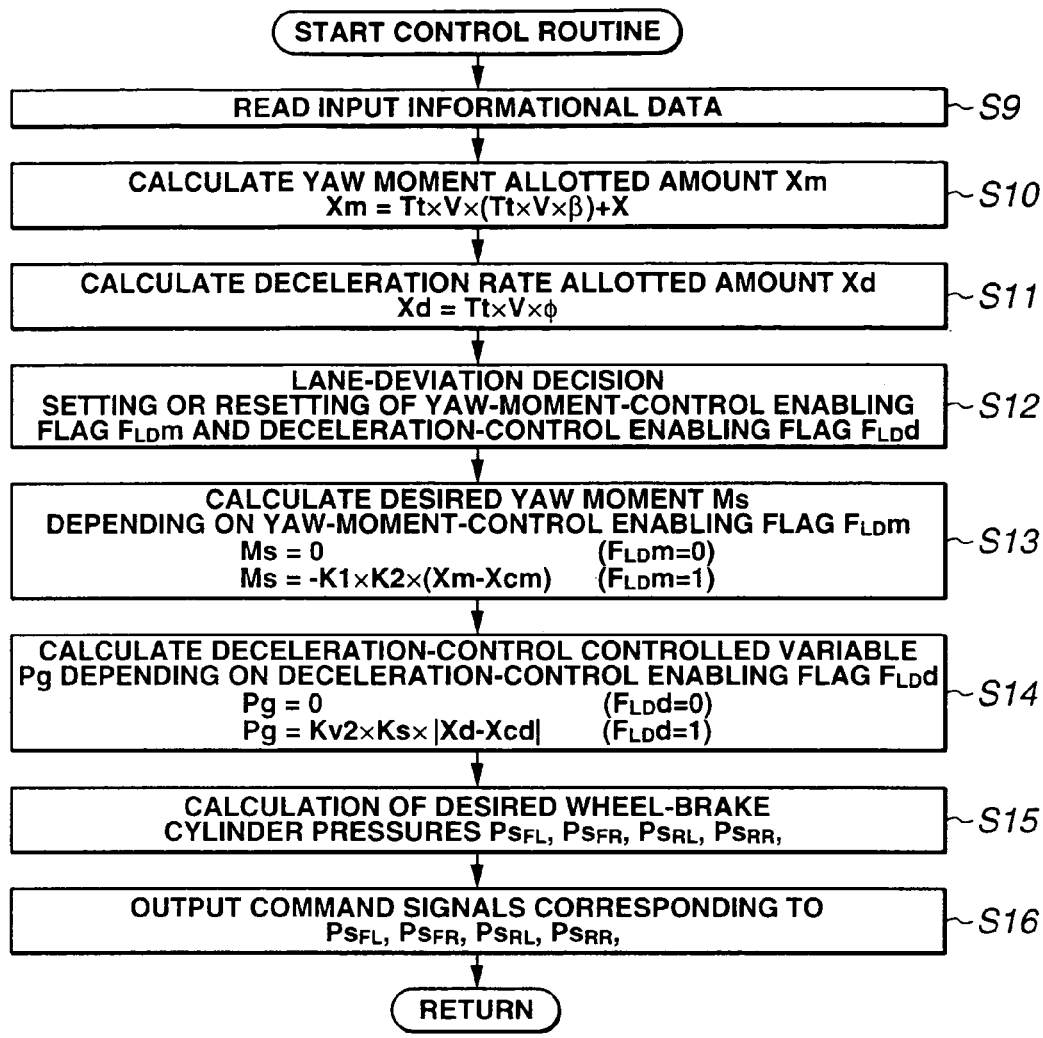
FIG. 4 is a flow chart showing a modified LDP control routine.

Referring now to FIG. 4, there is shown the modified LDP control routine. The modified LDP control routine shown in FIG. 4 is also executed as time-triggered interrupt routines to be triggered every predetermined time intervals such as 10 milliseconds. The modified routine of FIG. 4 is different from the routine of FIG. 2, in that yaw moment allotted amount Xm is arithmetically calculated based on lateral deviation X from the central axis of the current host vehicle's driving lane and curvature β of the driving lane through step S10 (described later), and deceleration rate allotted amount Xd is arithmetically calculated based on yaw angle φ through step S11 (described later).

Step S9 of FIG. 4 is identical to step S1 of FIG. 2. At step S9, input informational data from the previously-noted engine/vehicle switches and sensors, and driving-torque controller 12 and camera controller 14 are read. More concretely, read are engine/vehicle switch/sensor signal data, such as the host vehicle's longitudinal acceleration Xg, lateral acceleration Yg, yaw rate φ', wheel speeds Vwi, accelerator opening Acc, master-cylinder pressure Pm, steer angle δ, and direction indicator switch signal WS, and the signal data from driving-torque control unit 12 such as driving torque Tw, and the signal data from camera controller 14 such as the host vehicle's yaw angle φ with respect to the direction of the current host vehicle's driving lane, lateral deviation X from the central axis of the current host vehicle's driving lane, and curvature β of the current driving lane.

At step S10, yaw moment allotted amount Xm is estimated or arithmetically calculated based on the latest up-to-date information concerning lateral deviation X, curvature β, and host vehicle speed V $(=(Vw_{FL}+Vw_{FR})/2)$, from the following expression (11).

$$Xm = Tt \times V \times (Tt \times V \times \beta) + X \quad (11)$$

where Tt denotes a headway time between the host vehicle and the preceding vehicle both driving in the same sense and in the same lane, and the product $(Tt \times V)$ of the headway time Tt and the host vehicle's speed V means a distance between the current position of the host vehicle and the forward point-of-fixation.

As can be appreciated from the aforementioned expression (11), according to the modified routine of FIG. 4, the greater the lateral deviation X, the greater the yaw moment allotted amount Xm. Therefore, when the host vehicle greatly deviates from the driving lane, yaw moment allotted amount Xm is set to a greater value, and whereby it is possible to effectively decreasingly compensate for the turning radius of the host vehicle. Additionally, as can be seen from the expression (11), the greater the curvature β, the greater the yaw moment allotted amount Xm. Therefore, when the host vehicle goes around a steep curve of a comparatively large curvature, yaw moment allotted amount Xm can be set to a comparatively large value due to the large curvature, and whereby it is possible to decreasingly compensate for the turning radius of the host vehicle.

At step S11, deceleration rate allotted amount Xd is estimated or arithmetically calculated based on the latest up-to-date information concerning the host vehicle's yaw angle φ with respect to the direction of the current host vehicle's driving lane, and host vehicle speed V $(=(Vw_{FL}+Vw_{FR})/2)$, from the following expression (12).

$$Xd = Tt \times V \times \phi \quad (12)$$

where Tt denotes a headway time between the host vehicle and the preceding vehicle both driving in the same sense and in the same lane, and the product $(Tt \times V)$ of the headway time Tt and the host vehicle's speed V means a distance between the current position of the host vehicle and the forward point-of-fixation.

As can be appreciated from the aforementioned expression (12), according to the modified routine of FIG. 4, the greater the host vehicle's yaw angle φ with respect to the direction of the current host vehicle's driving lane, the greater the deceleration rate allotted amount Xd. Therefore, when the host vehicle greatly deviates from the driving lane, deceleration rate allotted amount Xd is set to a greater value, and whereby it is possible to effectively greatly reduce the host vehicle speed.

Figure 5:
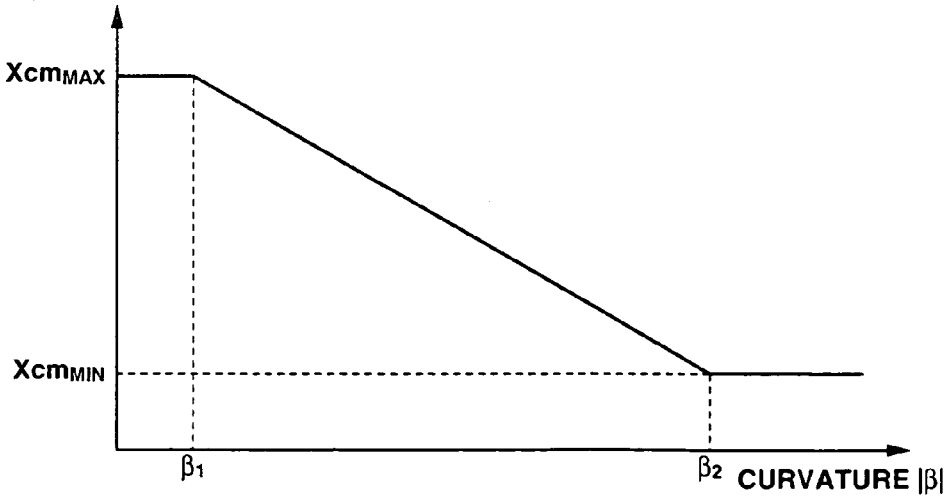
FIG. 5 is a predetermined |β| versus Xcm characteristic map used for the modified LDP control routine of FIG. 4.

At step S12, a check is made to determine whether there is a possibility or an increased tendency of lane deviation of the host vehicle from the current driving lane. First, yaw moment allotted amount Xm calculated through step 10 is compared with a yaw-moment-control initiation threshold value (simply, a yaw-moment-control threshold value) Xcm. Yaw-moment-control threshold value Xcm is calculated or retrieved from the preprogrammed curvature |β| versus yaw-moment-control initiation threshold value Xcm characteristic map of FIG. 5 showing how a yaw-moment-control threshold value Xcm has to be varied relative to an absolute value |β| of curvature β. As can be appreciated from the preprogrammed characteristic map of FIG. 5 showing the relationship between threshold value Xcm and curvature absolute value |β|, in a small curvature range (0≦|β|≦β₁) from 0 to a predetermined curvature β₁, threshold value Xcm is fixed to a predetermined maximum threshold value $Xcm_{MAX}$. In an intermediate curvature range (β₁<|β|≦β₂) from the predetermined small curvature β₁ to a predetermined large curvature β₂ (larger than β₁), threshold value Xcm gradually reduces to a predetermined minimum threshold value $Xcm_{MIN}$, as the curvature absolute value |β| increases. In an excessively large curvature range (β₂<|β|) above predetermined large curvature β₂, threshold value Xcm is fixed to predetermined minimum threshold value $Xcm_{MIN}$. When yaw moment allotted amount Xm becomes greater than or equal to a yaw-moment-control threshold value Xcm, that is, in case of Xm≧Xcm, a yaw-moment-control enabling flag $F_{LD}M$ is set to "1". On the contrary, in case of Xm<Xcm, another check is made to determine whether yaw moment allotted amount Xm is less than or equal to a negative value −Xcm of yaw-moment-control threshold value Xcm. In case of Xm≦−Xcm, yaw-moment-control enabling flag $F_{LD}m$ is set to "1". Alternatively, when the condition defined by Xm≧Xcm and Xm≦−Xcm are both unsatisfied, that is, in case of −Xcm<Xm<Xcm, yaw-moment-control enabling flag $F_{LD}m$ is reset to "0".

Figure 6:
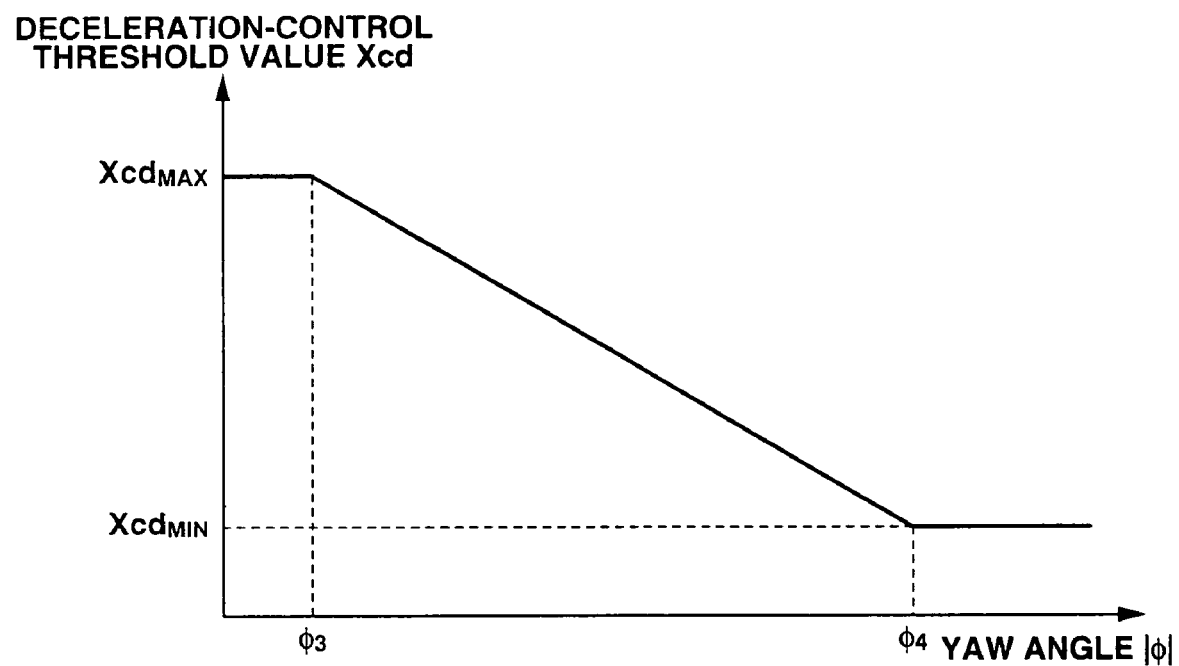
FIG. 6 is a predetermined |φ| versus Xcd characteristic map used for the modified LDP control routine of FIG. 4.

In a similar manner to setting or resetting of yaw-moment-control enabling flag $F_{LD}m$ as previously discussed, secondly, deceleration rate allotted amount Xd calculated through step 11 is compared with a deceleration-control initiation threshold value (simply, a deceleration-control threshold value) Xcd. Deceleration-control threshold value Xcd is calculated or retrieved from the preprogrammed yaw-angle |φ| versus deceleration-control initiation threshold value Xcd characteristic map of FIG. 6 showing how a deceleration-control threshold value Xcd has to be varied relative to an absolute value |φ| of yaw angle φ. As can be appreciated from the preprogrammed characteristic map of FIG. 6 showing the relationship between threshold value Xcd and yaw-angle absolute value |φ|, in a small yaw-angle range (0≦|φ|≦φ₃) from 0 to a predetermined yaw angle φ₃, threshold value Xcd is fixed to a predetermined maximum threshold value $Xcd_{MAX}$. In an intermediate yaw-angle range (φ₃<|φ|≦φ₄) from the predetermined small yaw angle φ₃ to a predetermined large yaw angle φ₄ (larger than φ₃), threshold value Xcd gradually reduces to a predetermined minimum threshold value $Xcd_{Min}$, as the yaw-angle absolute value |φ| increases. In an excessively large yaw-angle range (φ₄<|φ|) above predetermined large yaw angle φ₄, threshold value Xcd is fixed to predetermined minimum threshold value $Xcd_{MIN}$. When deceleration rate allotted amount Xd becomes greater than or equal to a deceleration-control threshold value Xcd, that is, in case of Xd≧Xcd, a deceleration-control enabling flag $F_{LD}d$ is set to "1". On the contrary, in case of Xd<Xcd, another check is made to determine whether deceleration rate allotted amount Xd is less than or equal to a negative value −Xcd of deceleration-control threshold value Xcd. In case of Xd≦−Xcd, deceleration-control enabling flag $F_{LD}d$ is set to "1". Alternatively, when the condition defined by Xd≧Xcd and Xd≦−Xcd are both unsatisfied, that is to say, in case of −Xcd<Xd<Xcd, deceleration-control enabling flag $F_{LD}d$ is reset to "0".

As discussed above, according to step S12 of the modified routine of FIG. 4, the greater the absolute value |β| of curvature β, the smaller the yaw-moment-control threshold value Xcm. Therefore, when the host vehicle goes around a steep curve of a comparatively large curvature, yaw-moment-control threshold value Xcm can be set to a comparatively small value due to the large curvature (see FIG. 5), and whereby it is possible to quickly increase the host vehicle's yaw rate φ' at an earlier timing. Additionally, according to step S12 of the modified routine of FIG. 4, the greater the absolute value |φ| of yaw angle φ, the smaller the deceleration-control threshold value Xcd. Therefore, when the host vehicle greatly deviates from the driving lane, deceleration-control threshold value Xcd is set to a smaller value, and whereby it is possible to quickly increasingly compensate for deceleration rate allotted amount Xd at an earlier timing.

At step S13, a desired yaw moment Ms is arithmetically calculated or estimated based on yaw moment allotted amount Xm calculated through step S10. Concretely, a check is made to determine whether yaw-moment-control enabling flag $F_{LD}M$, determined through step S12, is set (=1) or reset (=0). When yaw-moment-control enabling flag $F_{LD}m$ is set (=1), desired yaw moment Ms is arithmetically calculated from the following expression (13).

$$Ms = -K1 \times K2 \times (Xm - Xcm) \quad (13)$$

where K1 denotes a proportional gain that is determined by specifications of the host vehicle, and K2 denotes a proportional gain that is determined by host vehicle speed V.

Conversely when yaw-moment-control enabling flag $F_{LD}m$ is reset (=0), desired yaw moment Ms is set to "0".

At step S14, a deceleration-control controlled variable Pg is arithmetically calculated or estimated based on deceleration rate allotted amount Xd. Concretely, a check is made to determine whether deceleration-control enabling flag $F_{LD}d$ is set (=1) or reset (=0). When deceleration-control enabling flag $F_{LD}d$ is set, deceleration-control controlled variable Pg is arithmetically calculated from the following expression (14).

$$Pg = Kv2 \times Ks \times |Xd - Xcd| \quad (14)$$

where Kv2 denotes a proportional gain that is determined by specifications of the host vehicle, and Ks denotes the proportional gain that is determined by host vehicle speed V.

Conversely when deceleration-control enabling flag $F_{LD}d$ is reset (=0), deceleration-control controlled variable Pg is set to "0".

At step S15, front-left, front-right, rear-left, and rear-right desired wheel-brake cylinder pressures $Ps_{FL}$, $Ps_{FR}$, $Ps_{RL}$ and $Ps_{RR}$, which are collectively referred to as "Psi", are calculated and determined based on desired yaw moment Ms determined through step S13 and deceleration-control controlled variable Pg determined through step S14, depending on whether yaw-moment-control enabling flag $F_{LD}m$ is set or reset and also depending on whether deceleration-control enabling flag $F_{LD}d$ is set or reset.

Concretely, when the condition of $F_{LD}m=0$ and $F_{LD}d=0$ is satisfied, that is, when there is a less lane-deviation tendency, front-left and front-right desired wheel-brake cylinder pressures $Ps_{FL}$ and $Ps_{FR}$ for front wheel-brake cylinders 6FL and 6FR are set to "0", whereas rear-left and rear-right desired wheel-brake cylinder pressures $Ps_{RL}$ and $Ps_{RR}$ for rear wheel-brake cylinders 6RL and 6RR are set to "0" (see the following expressions).

$Ps_{FL}=0$ $Ps_{FR}=0$ $Ps_{RL}=0$ $Ps_{RR}=0$

Conversely when the condition of $F_{LD}m=1$ and $F_{LD}d=1$ is satisfied, that is, when there is an increased lane-deviation tendency, desired wheel-brake cylinder pressures $Ps_{FL}$, $Ps_{FR}$, $Ps_{RL}$ and $Ps_{RR}$ are determined depending on the magnitude of desired yaw moment Ms determined through step S13. More concretely, when the absolute value |MS| of desired yaw moment Ms is less than predetermined desired yaw-moment threshold value Ms0, (i.e., |MS|<MS0), the processor of ECU 8 determines each of desired wheel-brake cylinder pressures $Ps_{FL}$ through $Ps_{RR}$ in such a manner as to provide only the differential pressure between rear road wheels 5RL and 5RR. In other words, the differential pressure between front road wheels 5FL and 5FR is set to "0". Thus, in case of |MS|<MS0, the front desired wheel-brake cylinder pressure difference $\Delta Ps_{SF}$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are determined as follows.

$$\Delta Ps_{SF}=0$$

$$\Delta Ps_R = 2 \times Kb_R \times |Ms|/T \qquad (15)$$

where $Kb_R$ denotes a predetermined conversion coefficient used to convert a rear-wheel braking force into a rear wheel-brake cylinder pressure and T denotes a rear-wheel tread (or a rear-wheel track).

Conversely when the absolute value |MS| of desired yaw moment Ms is greater than or equal to the predetermined threshold value Ms0, (i.e., |Ms|≧Ms0), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_{SF}$ and $\Delta Ps_R$ are represented by the following expressions (16) and (17).

$$\Delta Ps_F = 2 \times Kb_F \times (|MS|-Ms0)/T \qquad (16)$$

$$\Delta Ps_R = 2 \times Kb_R \times Ms0/T \qquad (17)$$

where $Kb_F$ denotes a predetermined conversion coefficient used to convert a front-wheel braking force into a front wheel-brake cylinder pressure, $Kb_R$ denotes a predetermined conversion coefficient used to convert a rear-wheel braking force into a rear wheel-brake cylinder pressure, T of the expression (16) and T of the expression (17) denote front and rear wheel treads being the same in front and rear wheels, and Ms0 denotes the predetermined desired yaw-moment threshold value.

Therefore, when desired yaw moment Ms is a negative value (Ms<0), in other words, the host vehicle tends to deviate from the current driving lane to the left, in order to produce the component of yaw moment vector needed to rotate the host vehicle to the right, front-left desired wheel-brake cylinder pressure $Ps_{FL}$ is set to a front-wheel brake fluid pressure $Pg_F$, front-right desired wheel-brake cylinder pressure $Ps_{FR}$ is set to the sum ($Pg_F+\Delta Ps_F$) of front-wheel brake fluid pressure $Pg_F$ and front desired wheel-brake cylinder pressure difference $\Delta Ps_F$, rear-left desired wheel-brake cylinder pressure $Ps_{RL}$ is set to rear-wheel brake fluid pressure $Pg_R$, and rear-right desired wheel-brake cylinder pressure $Ps_{RR}$ is set to the sum ($Pg_R+\Delta Ps_R$) of rear-wheel brake fluid pressure $Pg_R$ and rear desired wheel-brake cylinder pressure difference $\Delta Ps_R$ (see the following expression (18)).

$$Ps_{FL}=Pg_F$$

$$Ps_{FR}=Pg_F+\Delta Ps_F$$

$$Ps_{RL}=Pg_R$$

$$Ps_{RR}=Pg_R+\Delta Ps_R \qquad (18)$$

where front-wheel brake fluid pressure $Pg_F$ and rear-wheel brake fluid pressure $Pg_R$ are calculated and determined based on deceleration-control controlled variable Pg, taking into account an ideal front-and-rear braking force distribution.

On the contrary, when desired yaw moment Ms is a positive value (Ms≧0), in other words, the host vehicle tends to deviate from the current driving lane to the right, in order to produce the component of yaw moment vector needed to rotate the host vehicle to the left, front-left desired wheel-brake cylinder pressure $Ps_{FL}$ is set to the sum ($Pg_F+\Delta Ps_{SF}$) of front-wheel brake fluid pressure $Pg_F$ and front desired wheel-brake cylinder pressure difference $\Delta Ps_{SF}$, front-right desired wheel-brake cylinder pressure $Ps_{FR}$ is set to front-wheel brake fluid pressure $Pg_F$, rear-left desired wheel-brake cylinder pressure $Ps_{RL}$ is set to the sum ($Pg_R+\Delta Ps_R$) of rear-wheel brake fluid pressure $Pg_R$ and rear desired wheel-brake cylinder pressure difference $\Delta Ps_R$, and rear-right desired wheel-brake cylinder pressure $Ps_{RR}$ is set to rear-wheel brake fluid pressure $Pg_R$ (see the following expression (19)).

$$Ps_{FL}=Pg_F+\Delta Ps_F$$

$$Ps_{FR}=Pg_F$$

$$Ps_{RL}=Pg_R+\Delta Ps_R$$

$$Ps_{RR}=Pg_R \qquad (19)$$

At step S16, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S15, are output from the output interface of ECU 8 to hydraulic modulator 7. In this manner, one cycle of the time-triggered interrupt routine (the modified routine of FIG. 4) terminates and the predetermined main program is returned.

The LDP apparatus of the embodiment executing the modified routine shown in FIG. 4 operates as follows.

Suppose that the traveling direction of the host vehicle greatly deviates from the axial direction of the central axis of the driving lane when the host vehicle goes around a steep curve to the right, and thus the angle (yaw angle φ) between the central axis of the host vehicle's driving lane and the longitudinal axis (the x-axis) of the host vehicle becomes large. At this time, within the processor of ECU 8, as seen from the flow chart of FIG. 4, input informational data (Xg, Yg, φ', Vwi, Acc, Pm, δ, WS, Tw, φ, X, and β) from the previously-noted engine/vehicle switches and sensors, and driving-torque controller 12 and camera controller 14 are read through step S9. Then, yaw moment allotted amount Xm (=Tt×V×(Tt×V×β)+X) is set to a comparatively large value through step S10 because of the large curvature β and large lateral deviation X, whereas deceleration rate allotted amount Xd (=Tt×V×φ) is set to a comparatively large value through step S11 because of the large yaw angle φ. On the other hand, by way of step S12, as can be seen from the characteristic maps shown in FIGS. 5 and 6, yaw-moment-control threshold value Xcm and deceleration-control threshold value Xcd are both set to small values, because of large absolute values |φ| and |β|. In addition to the above, suppose that yaw moment allotted amount Xm is calculated as a value above yaw-moment-control threshold value Xcm and deceleration rate allotted amount Xd is calculated as a value above deceleration-control threshold value Xcd. At this time, the condition of Xm≧Xcm and Xd≧Xcd is satisfied, and thus yaw-moment-control enabling flag $F_{LD}m$ and deceleration-control enabling flag $F_{LD}d$ are both set (=1). After this, at step S13, desired yaw moment Ms is calculated and determined based on yaw moment allotted amount Xm and yaw-moment-control threshold value Xcm from the expression (13), such that yaw moment allotted amount Xm reduces with the lapse of time. Additionally, at step S14, a comparatively great deceleration-control controlled variable Pg is calculated based on deceleration rate allotted amount Xd (=Tt×V×φ) from the expression Pg=Kv2×Ks×|Xd−Xcd|, such that deceleration rate allotted amount Xd reduces with the lapse of time. Thereafter, at step S15, desired wheel-brake cylinder pressures $Ps_{FL}$, $Ps_{FR}$, $Ps_{RL}$ and $Ps_{RR}$ are calculated based on desired yaw moment Ms determined through step S13 and deceleration-control controlled variable Pg determined through step S14, and then at step S16 command signals corresponding to front-left, front-right, rear-left, and rear-right desired wheel-brake cylinder pressures $Ps_{FL}$, $Ps_{FR}$, $Ps_{RL}$, and $Ps_{RR}$, calculated based on deceleration-control controlled variable Pg through step S15, are output from the output interface of ECU 8 to hydraulic modulator 7. In response to the command signals, the wheel-brake cylinder pressures of road wheels 5FL, 5FR, 5RL, and 5RR are brought closer to the desired wheel-brake cylinder pressures $Ps_{FL}$, $Ps_{FR}$, $Ps_{RL}$, and $Ps_{RR}$. As a result, it is possible to properly greatly decelerate the host vehicle and to generate the yaw moment in a direction decreasing of yaw moment allotted amount Xm. As a consequence, it is possible to quickly reduce the host vehicle speed V at an earlier timing, thus effectively decreasingly compensating for the turning radius of the host vehicle and remarkably enhancing the lane deviation prevention performance.

In the shown embodiment, the previously-noted engine/vehicle switches and sensors and camera controller 14, and steps S1–S3 of the arithmetic processing of FIG. 2 and step S9 of the arithmetic processing of FIG. 4 serve as a lane-deviation tendency detection means. Step S4 of the arithmetic processing of FIG. 2 and steps S10–S11 of the arithmetic processing of FIG. 4 serve as a lane-deviation-avoidance controlled variable setting means. Step S5 of the arithmetic processing of FIG. 2 and step S13 of the arithmetic processing of FIG. 4 serve as a desired yaw moment calculation means. Step S6 of the arithmetic processing of FIG. 2 and step S14 of the arithmetic processing of FIG. 4 serve as a deceleration-control controlled variable calculation means. Steps S7–S8 of the arithmetic processing of FIG. 2 and steps S15–S16 of the arithmetic processing of FIG. 4 serve as a braking force control means. Step S2 of the arithmetic processing of FIG. 2 also serves as a future lane-deviation estimate calculation means that estimates or calculates a future lane-deviation estimate, that is, the difference (|XS|−$X_c$) between the absolute value |XS| of lateral-displacement estimate XS and predetermined lateral-displacement criterion $X_c$. Yaw moment allotted amount Xm, discussed in reference to the LDP control routine of FIG. 2 and the modified LDP control routine of FIG. 4, corresponds to a yaw-moment-control lane-deviation-avoidance controlled variable used to avoid the host vehicle's lane deviation by way of yaw moment control, whereas deceleration rate allotted amount Xd, discussed in reference to the LDP control routine of FIG. 2 and the modified LDP control routine of FIG. 4, corresponds to a deceleration-control lane-deviation-avoidance controlled variable used to avoid the host vehicle's lane deviation by way of vehicle deceleration control.

The entire contents of Japanese Patent Application No. 2003-078662 (filed Mar. 20, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive lane deviation prevention apparatus comprising:
    braking force actuators that adjust braking forces applied to respective road wheels;
    sensors that detect a driving state of a host vehicle and a traveling-path condition where the host vehicle is traveling; and
    a control unit being configured to be electronically connected to the braking force actuators and the sensors, for controlling the braking force actuators in response to signals from the sensors for lane deviation avoidance purposes; the control unit comprising:
        (a) a lane-deviation tendency detection section that determines whether the host vehicle has a tendency to deviate from a driving lane;
        (b) a lane-deviation-avoidance (LDA) controlled variable setting section that sets a yaw-moment-control LDA controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition in a presence of the host vehicle's lane-deviation tendency;
        (c) a desired yaw moment calculation section that calculates a desired yaw moment based on the yaw-moment-control LDA controlled variable so that a yaw moment is produced in a direction in which the host vehicle's lane-deviation tendency is avoided;
        (d) a deceleration-control controlled variable calculation section that calculates a controlled variable for the vehicle deceleration control based on the deceleration-control LDA controlled variable; and
        (e) a control section that controls the braking force of each of the road wheels based on the desired yaw moment and the controlled variable for the vehicle deceleration control,
    wherein the LDA controlled variable setting section sets both of the yaw-moment-control LDA controlled variable and the deceleration-control LDA controlled variable, based on a host vehicle's yaw angle corresponding to an orientation of the host vehicle with respect to a direction of the host vehicle's driving lane.

2. The automotive lane deviation prevention apparatus as claimed in claim 1, further comprising:
    a future lane-deviation estimate calculation section that calculates a future lane-deviation estimate as a difference between an absolute value of a lateral-displacement estimate and a predetermined lateral-displacement criterion, the lateral-displacement estimate being determined based on at least a host vehicle's lateral deviation corresponding to a position of the host vehicle relative to a central axis of the driving lane, wherein the LDA controlled variable setting section limits the yaw-moment-control LDA controlled variable based on at least one of the host vehicle's driving state and the traveling-path condition, by preferentially allotting the future lane-deviation estimate to the yaw-moment-control LDA controlled variable and by allotting a remainder of the future lane-deviation estimate to the deceleration-control LDA controlled variable.

3. The automotive lane deviation prevention apparatus as claimed in claim 1, wherein:

the LDA controlled variable setting section sets the yaw-moment-control LDA controlled variable based on at least one of a curvature of the driving lane and a host vehicle's lateral deviation corresponding to a position of the host vehicle relative to a central axis of the driving lane, and sets the deceleration-control LDA controlled variable based on the host vehicle's yaw angle corresponding to the orientation of the host vehicle with respect to the direction of the host vehicle's driving lane.

4. The automotive lane deviation prevention apparatus as claimed in claim 3, wherein:

the LDA controlled variable setting section comprises a yaw-moment-control initiation threshold value setting portion that sets a yaw-moment-control initiation threshold value based on the curvature of the driving lane and a deceleration-control initiation threshold value setting portion that sets a deceleration-control initiation threshold value based on the host vehicle's yaw angle corresponding to the orientation of the host vehicle with respect to the direction of the host vehicle's driving lane; and the LDA controlled variable setting section determines the desired yaw moment based on the yaw-moment-control LDA controlled variable and the yaw-moment-control initiation threshold value, and determines the controlled variable for the vehicle deceleration control based on the deceleration-control LDA controlled variable and the deceleration-control initiation threshold value.

5. The automotive lane deviation prevention apparatus as claimed in claim 2, wherein:

the lateral-displacement estimate is arithmetically calculated from the following expression $$XS=Tt \times V \times (\phi+Tt \times V \times \beta)+X$$

where Tt is a headway time between the host vehicle and a preceding vehicle both driving in the same sense and in the same lane, V is a host vehicle speed, $\phi$ is the host vehicle's yaw angle corresponding to the orientation of the host vehicle with respect to the direction of the host vehicle's driving lane, $\beta$ is a curvature of the host vehicle's driving lane, and X is the host vehicle's lateral deviation corresponding to the position of the host vehicle relative to the central axis of the driving lane.

6. The automotive lane deviation prevention apparatus as claimed in claim 1, wherein:

the desired yaw moment for the yaw moment control is arithmetically calculated from the following expression $$Ms=-Kv1 \times Ks \times Xm$$

where Kv1 is a proportional gain that is determined by specifications of the host vehicle, Ks is a proportional gain that is determined by a host vehicle speed, and Xm is the yaw-moment-control LDA controlled variable, and the controlled variable for the vehicle deceleration control is arithmetically calculated from the following expression $$Pg=Kv2 \times Ks \times |Xd|$$

where Kv2 is a proportional gain that is determined by specifications of the host vehicle, Ks is the proportional gain that is determined by the host vehicle speed, and Xd is the deceleration-control LDA controlled variable.

7. The automotive lane deviation prevention apparatus as claimed in claim 4, wherein:

the yaw-moment-control LDA controlled variable is arithmetically calculated from the following expression $$Xm=Tt \times V \times (Tt \times V \times \beta)+X$$

where Tt is a headway time between the host vehicle and a preceding vehicle both driving in the same sense and in the same lane, V is a host vehicle speed, $\beta$ is the curvature of the host vehicle's driving lane, and X is the host vehicle's lateral deviation corresponding to the position of the host vehicle relative to the central axis of the driving lane, and the deceleration-control LDA controlled variable is arithmetically calculated from the following expression $$Xd=Tt \times V \times \phi$$

where Tt is the headway time between the host vehicle and the preceding vehicle both driving in the same sense and in the same lane, V is the host vehicle speed, and $\phi$ is the host vehicle's yaw angle corresponding to an orientation of the host vehicle with respect to a direction of the host vehicle's driving lane, and the desired yaw moment for the yaw moment control is arithmetically calculated from the following expression $$Ms=-K1 \times K2 \times (Xm-Xcm)$$

where K1 is a proportional gain that is determined by specifications of the host vehicle, K2 is a proportional gain that is determined by the host vehicle speed, Xm is the yaw-moment-control LDA controlled variable, and Xcm is the yaw-moment-control initiation threshold value, and the controlled variable for the vehicle deceleration control is arithmetically calculated from the following expression $$Pg=Kv2 \times Ks \times |Xd-Xcd|$$

where Kv2 is a proportional gain that is determined by specifications of the host vehicle, Ks is the proportional gain that is determined by the host vehicle speed, Xd is the deceleration-control LDA controlled variable, and Xcd is the deceleration-control initiation threshold value.

8. A method of preventing lane deviation of a host vehicle equipped with braking force actuators that adjust braking forces applied to respective road wheels and sensors that detect a driving state of the host vehicle and a traveling-path condition where the host vehicle is traveling, the method comprising:

setting a yaw-moment-control lane-deviation-avoidance (LDA) controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition, when the host vehicle has a tendency to deviate from a driving lane;

controlling the braking force of each of the road wheels based on the yaw-moment-control LDA controlled variable and the deceleration-control LDA controlled variable;

calculating a yaw-moment-control initiation threshold value based on a curvature of the driving lane;

calculating a deceleration-control initiation threshold value based on a host vehicle's yaw angle corresponding to an orientation of the host vehicle with respect to a direction of the host vehicle's driving lane;

calculating a desired yaw moment based on the yaw-moment-control LDA controlled variable and the yaw-moment-control initiation threshold value so that a yaw moment is produced in a direction in which the host vehicle's lane-deviation tendency is avoided;

calculating a controlled variable for the vehicle deceleration control based on the deceleration-control LDA controlled variable and the deceleration-control initiation threshold value; and controlling the braking force of each of the road wheels based on the desired yaw moment and the controlled variable for the vehicle deceleration control.

9. An automotive lane deviation prevention apparatus comprising:

a braking force adjusting means for adjusting braking forces applied to respective road wheels;

a sensor means for detecting a driving state of a host vehicle and a traveling-path condition where the host vehicle is traveling; and a control unit being configured to be electronically connected to the braking force adjusting means and the sensor means, for controlling the braking force adjusting means in response to signals from the sensor means for lane deviation avoidance purposes; the control unit comprising:

(a) a lane-deviation tendency detection means for determining whether the host vehicle has a tendency to deviate from a driving lane;

(b) a lane-deviation-avoidance (LDA) controlled variable setting means for setting a yaw-moment-control LDA controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition in a presence of the host vehicle's lane-deviation tendency;

(c) a desired yaw moment calculation means for calculating a desired yaw moment based on the yaw-moment-control LDA controlled variable so that a yaw moment is produced in a direction in which the host vehicle's lane-deviation tendency is avoided;

(d) a deceleration-control controlled variable calculation means for calculating a controlled variable for the vehicle deceleration control based on the deceleration-control LDA controlled variable; and (e) a control means for controlling the braking force of each of the road wheels based on the desired yaw moment and the controlled variable for the vehicle deceleration control, wherein the LDA controlled variable setting means sets both of the yaw-moment-control LDA controlled variable and the deceleration-control LDA controlled variable, based on a host vehicle's yaw angle corresponding to an orientation of the host vehicle with respect to a direction of the host vehicle's driving lane.

10. A method of preventing lane deviation of a host vehicle equipped with braking force actuators that adjust braking forces applied to respective road wheels and sensors that detect a driving state of the host vehicle and a traveling-path condition where the host vehicle is traveling, the method comprising:

determining whether the host vehicle has a tendency to deviate from a driving lane;

setting a yaw-moment-control lane-deviation avoidance (LDA) controlled variable used to avoid the host vehicle's lane deviation by way of yaw moment control and a deceleration-control LDA controlled variable used to avoid the host vehicle's lane deviation by way of vehicle deceleration control, based on at least one of the host vehicle's driving state and the traveling-path condition in presence of the host vehicle's lane-deviation tendency;

calculating a desired yaw moment based on the yaw-moment-control LDA controlled variable so that a yaw moment is produced in a direction in which the host vehicle's lane- deviation tendency is avoided;

calculating a controlled variable for the vehicle deceleration control based on the deceleration-control LDA controlled variable;

controlling the braking force of each of the road wheels based on the desired yaw moment and the controlled variable for the vehicle deceleration control; and setting both of the yaw-moment-control LDA controlled variable and the deceleration-control LDA controlled variable, based on a host vehicle's yaw angle corresponding to an orientation of the host vehicle with respect to a direction of the host vehicle's driving lane.

* * * * *